United States Patent [19]

Edem et al.

[11] Patent Number: 5,687,174

[45] Date of Patent: Nov. 11, 1997

[54] NETWORK LINK ENDPOINT CAPABILITY DETECTION

[75] Inventors: Brian C. Edem, San Jose; Debra J. Worsley, Sunnyvale, both of Calif.

[73] Assignee: National Semiconductor Corporation, Santa Clara, Calif.

[21] Appl. No.: 430,143

[22] Filed: Apr. 26, 1995

Related U.S. Application Data

[63] Continuation of Ser. No. 971,018, Nov. 2, 1992, abandoned.

[51] Int. Cl.$^6$ .................................................. H04L 12/44
[52] U.S. Cl. .......................... 370/446; 370/453; 370/465; 370/522
[58] Field of Search ..................... 370/94.1, 94.2, 370/94.3, 85.2, 85.3, 85.4, 85.5, 85.13, 85.14, 110.1, 31, 24, 465, 466, 401, 402, 403, 407, 408, 410, 522, 445, 446, 453; 340/825.5, 825.51, 825.06, 825.07, 825.54; 375/377, 222

[56] References Cited

U.S. PATENT DOCUMENTS

| | | | |
|---|---|---|---|
| 4,220,816 | 9/1980 | Howells et al. | 370/24 |
| 4,258,434 | 3/1981 | Glowinski et al. | 370/60 |
| 4,412,324 | 10/1983 | Glowinsky et al. | 370/58.1 |
| 4,530,088 | 7/1985 | Hamstra et al. | 370/110.1 |
| 4,549,292 | 10/1985 | Isaman et al. | 370/85.7 |
| 4,587,650 | 5/1986 | Bell | 370/85.5 |
| 4,637,014 | 1/1987 | Bell et al. | 370/85.7 |
| 4,677,611 | 6/1987 | Yanosy, Jr. et al. | 370/85.2 |
| 4,766,590 | 8/1988 | Hamada et al. | 370/85.15 |
| 4,825,435 | 4/1989 | Amundsen et al. | 370/85.1 |
| 4,845,609 | 7/1989 | Lighthart et al. | 370/85.4 |
| 4,931,250 | 6/1990 | Greszczuk | 375/8 |
| 4,961,188 | 10/1990 | Lau | 370/94.2 |
| 5,001,707 | 3/1991 | Kositpaiboon | 370/85.1 |
| 5,058,110 | 10/1991 | Beach et al. | 370/85.6 |
| 5,095,494 | 3/1992 | Takahashi et al. | 375/121 |
| 5,134,611 | 7/1992 | Steinka et al. | 375/121 |
| 5,179,554 | 1/1993 | Lomicka et al. | 370/85.13 |
| 5,202,899 | 4/1993 | Walsh | 375/121 |
| 5,305,317 | 4/1994 | Szczepanek | 370/85.5 |
| 5,311,114 | 5/1994 | Sambamurthy et al. | 370/85.3 |
| 5,410,535 | 4/1995 | Yang et al. | 370/13 |

FOREIGN PATENT DOCUMENTS

| | | |
|---|---|---|
| A4221 474 A1 | 10/1992 | Germany. |
| WO-A-89 11183 | 11/1989 | WIPO. |

OTHER PUBLICATIONS

Integrated PBX Systems, An NCC State of the Art Report, The National Computing Centre Limited, 1987.

ISDN Basic Rate Interface System Design Guide, Telenetworks document, Aug., 1989.

(List continued on next page.)

*Primary Examiner*—Douglas W. Olms
*Assistant Examiner*—Chau T. Nguyen
*Attorney, Agent, or Firm*—Limbach & Limbach L.L.P.

[57] ABSTRACT

Support for a mixed network environment is provided which can contain multiple isochronous and/or non-isochronous LAN protocols such as isochronous-ethernet, ethernet, isochronous-token ring, token ring, other isochronous-LAN or other LAN systems. Support for a mixed environment includes a protocol detection mechanism which is embodied in a handshaking scheme. This handshaking scheme determines the signalling capability at the end points of the link and implements the correct protocol. This enables isochronous nodes and hubs to automatically detect the presence of ethernet, token ring, or other LAN equipment at the other end of the network cable. If this detection occurs, the isochronous LAN equipment will fall-back to a LAN compliant mode of operation. Typically, only the hub will have the capability of operating in different networking modes, such as ethernet, Token Ring isochronous modes. The hub will listen for some form of identification from the attached nodes as to the type of service to provide—isochronous or non-isochronous; ethernet, token ring or other LAN service.

72 Claims, 9 Drawing Sheets

OTHER PUBLICATIONS

ISDN Primary Rate Interface System Design Guide, Telenetworks document, Jul., 1989.

Draft Supplement to IEEE STD 802.3 CSMA/CD Access Method and Physical Layer Specifications, The Institute of Electrical and Electronic Engineers, Inc., (Nov. 15, 1989).

Apple Computer drawings, Mar. 5, 1990.

Irube et al., "Integrated Information and Communication System for Business Networks" *Hitachi Review* 40(3):241–247 (1991).

HMUX ERX "FDDI–II Hybrid Multiplexor" Rev. 2.4, 1991.

IBM Corporation "Task Order," pp. 6–7, 1992.

DP8390 "Network Interface Controller: An Introductory Guide," LAN Databook, pp. 206–213, 1992.

DP83932B "Systems–Oriented Network Interface Controller, LAN Databook," pp. 288–383, 1992.

DP83950EP at IEEE 802.3, Multi–Port Repeater Evaluation Kit, LAN Databook, pp. 75–87, 1992.

IEEE 802.9 Draft Standard Integrated Services (IS) LAN Interface at the MAC and PHY Layers, Institute of Electrical and Electronics, Nov., 1992.

"National Proposes Isochoronous Ethernet," *Electronic News*, vol. 38, No. 1940, p. 19, Nov., 1992.

"IBM's Multimedia Venture: Opportunity for its Hardware?", vol. 38, No. 1930, p. 1, Sep., 1992.

D. Wong, 'Second Generation 10BASE T Silicon Solutions', IRE Wescon Convention Record, vol. 35, Nov. 1991, North Hollywood US, pp. 238–242.

C. A. Gallagher 'IEEE 802.9: A Multi–Service Lan Interface', Second IEEE National Conference on Telecommunications, Apr. 1989, York GB pp. 173–178.

DP83950A "Repeater Interface Controller", LAN Databook, pp. 3–75, 1992.

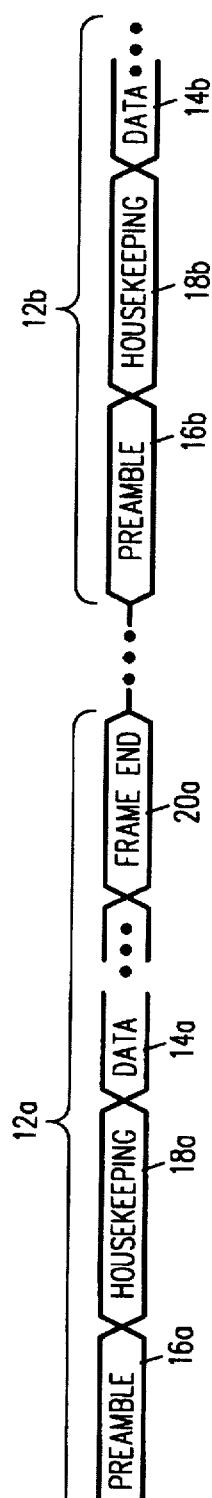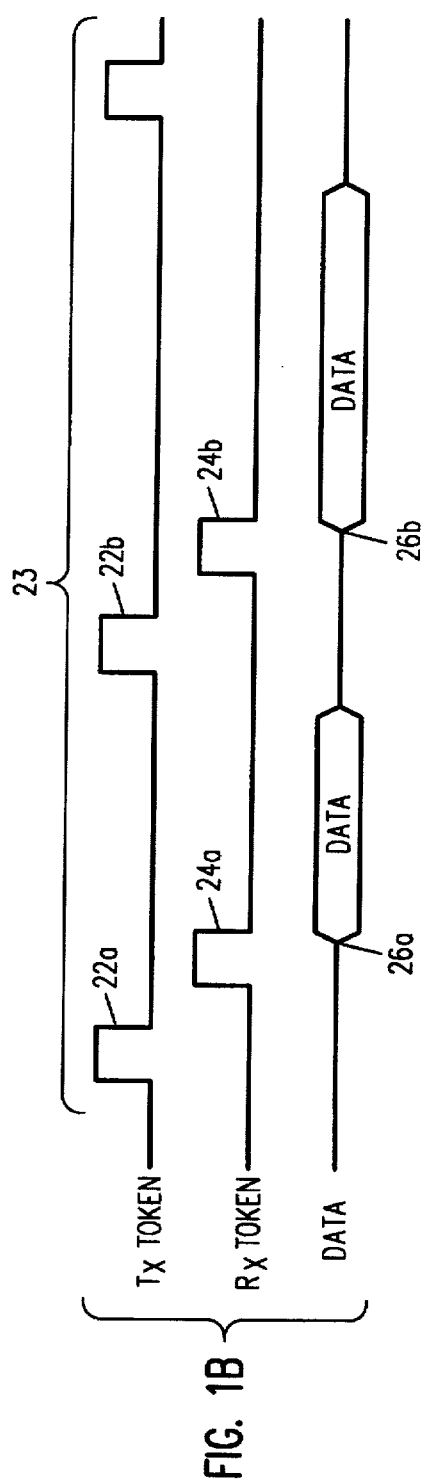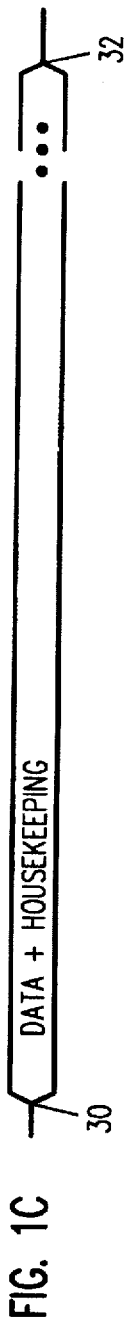
FIG. 1A
FIG. 1B
FIG. 1C

NETWORK LINK ENDPOINT CAPABILITY DETECTION

This is a continuation of application Ser. No. 07/971,018, filed on Nov. 2, 1992 and now abandoned.

The present invention is directed to a method and apparatus for detecting, in a network, such as a local area network, the protocol capability of one or more endpoints of a data communication link, and in particular to a method and apparatus for determining whether a data source/sink at the end of a datalink has the capability of a first data communication protocol or a second data communication protocol.

BACKGROUND OF THE INVENTION

A typical data communication network is configured to operate according to a single predetermined protocol, e.g., an ethernet protocol, a token ring protocol, other LAN protocols, or an isochronous protocol. An example of an ethernet system is an implementation known as 10BASE-T which is described in the draft Nine supplement to IEEE standard 802.3, dated Nov. 15, 1989. Other examples of data communication protocols are X.25, and the Token Ring System, described for example, by IEEE Standard 802.5. Both ethernet and token ring systems convey data in packets but each uses a different media access method.

As shown in FIG. 1A, in a packet system, data is transferred in a plurality of packets 12a, 12b which can be either constant-sized or variable-sized. Each packet includes a field of data 14a, 14b which may be preceded and/or followed by non-data information such as preamble information 16a, 16b housekeeping information such as data source information, data destination information, and the like 18a, 18b and a frame end marker 20a. As seen in FIG. 1A, because the fields provided for data 14a, 14b are not substantially continuous, the packetized scheme of FIG. 1A is not isochronous but "bursty" in nature.

In a token ring system, a node is permitted to transmit data only after receipt of an electronic "token." As depicted in FIG. 1B, a first station may transmit a token 22a which is received 24a by a second station whereupon the second station may begin transmission of data 26a. After a period of data transmission, the second station transmits the token 22b which is received by a third station 24b that can then begin its own transmission of data 26b. As seen in FIG. 1B, because data transmission is synchronized with the occurrence of an event (the arrival of a token), the token ring system is not an isochronous data transfer system.

FIG. 1C schematically depicts isochronous data transfer. In general terms, isochronous data is data which is non-packetized and of indeterminate, potentially continuous duration. In isochronous data transfer, the data transfer is initiated, such as by initiating a telephone conversation or beginning a video camera transmission 30. After the data transfer or connection is initiated, transmission of the data, possibly accompanied by transmission of housekeeping information (such as destinations, audio or video timing, and the like) is provided substantially continuously for an indeterminate period, such as until termination of the connection 32. Although it may be that not every bit transferred represents a data bit (since "housekeeping" bits may be also transferred), the transfer of data is substantially continuous in the sense that there are no substantial periods during which no data bits are transferred. It is possible that the data being transferred is "Null" data such as silence during a telephone conversation or transfer of a blank video image. One type of isochronous data transfer protocol is the Fiber Distributed Data Interface-II (FDDI-II) as described, for example, in *FDDI-II Hybrid Multiplexer*, Revision 2.4, dated Mar. 25, 1991.

Previous systems which were configured to use only a single-type protocol had the disadvantage that it was not possible to operate a mixed-protocol or "mixed-environment" system. Also, when upgrading a network system, it was necessary to upgrade the entire system and it was infeasible or wasteful to upgrade only part of the system (such as only some of the nodes or such as upgrading nodes without upgrading hubs or upgrading hubs without upgrading nodes). Additionally, when a system or system components were installed, or repaired it was necessary for the installing personnel to be familiar with the particular single protocol for which the network was configured and to make such installation, upgrade, or repair in accordance with such a single protocol. Furthermore, it was necessary that apparatus connected to the system be configured for exclusive operation in accordance with the predetermined single protocol.

SUMMARY OF THE INVENTION

The present invention includes a recognition of the problems found in previous devices. According to an embodiment of the present invention, apparatus connected to one endpoint of a network link is able to detect the protocol capability of the apparatus connected to the other end of the network link. Preferably, the first end of the network link has a capability of providing data communication under at least two different protocols and can select the appropriate protocol depending on what type of protocol capability is detected in the apparatus at the other end of the link.

Link endpoint capability detection takes advantage of the fact that different data communication protocols provide signals on the physical medium which have different characteristics. The various protocols can typically be detected by their unique timing and data patterns. According to one aspect of the invention, the network has a star topology with at least one hub and a plurality of nodes each node being connected to a hub by physical media constituting the link. The capability detection of the present invention can be performed by apparatus at either end of a link, and in particular, in a star topology network can be conducted by the hub or by any node. In one embodiment, capability detection is initiated by the hub. In a non-star topology at least one node can operate under two or more protocols and can detect the capability of another node with which it is connected.

The apparatus which initiates capability detection, according to one embodiment, transmits a signal onto the physical medium. In one embodiment, the apparatus at the far end of the link outputs, onto the physical medium, a second signal. Preferably, a second signal will be output from the apparatus at the far end of the link, regardless of whether the apparatus at the far end operates according to a first protocol or a second protocol. However, the second signal which is placed onto the physical medium at the far end of the link has either a first form or a second form, depending on whether the apparatus at the far end has a first protocol capability or a second protocol capability. This difference in signal is detected at the first end of the link and this could be used as a basis for determining the protocol capability at the far end of the link.

In another embodiment, the first apparatus outputs a first signal. The second apparatus outputs a response only if it has a first protocol capability. If no response is output, the first apparatus outputs a second signal in an attempt to elicit a response according to a second protocol. This process can be repeated until the first apparatus outputs a signal to which the second apparatus responds, thereby indicating a protocol capability of the second apparatus.

According to one embodiment, the first signal which is output, also carries information regarding the protocol capability of the first endpoint. That is, preferably, the first signal has a first form if the first endpoint has a first protocol capability and it has a second form if the first endpoint has a second protocol capability. Preferably, the apparatus at the far end of the link will respond to either of these forms in the manner described above.

In the preferred embodiment, the apparatus which has detected the capability at the far endpoint adjusts its operation to accommodate that capability. For example, when the first endpoint detects that the far endpoint has a first protocol capability, the first endpoint will configure itself to conduct subsequent communication using the first protocol. However, if the first endpoint detects that the far endpoint has a second protocol capability, the first endpoint is able to configure itself to accommodate the second protocol capability.

In one embodiment, the far endpoint will have only a single protocol capability. However, it is possible to configure a network in which both link endpoints have multiple protocol capabilities and both can detect one or more capabilities at the opposite endpoint. The endpoints can then configure themselves to operate at the best or most desired protocol level.

BRIEF DESCRIPTION OF THE DRAWINGS

FIGS. 1A, 1B and 1C of the timing of a packet transmission system, a token ring transmission system, and an isochronous transmission system respectively;

DETAILED DESCRIPTION OF THE PREFERRED EMBODIMENT

Figure 2:
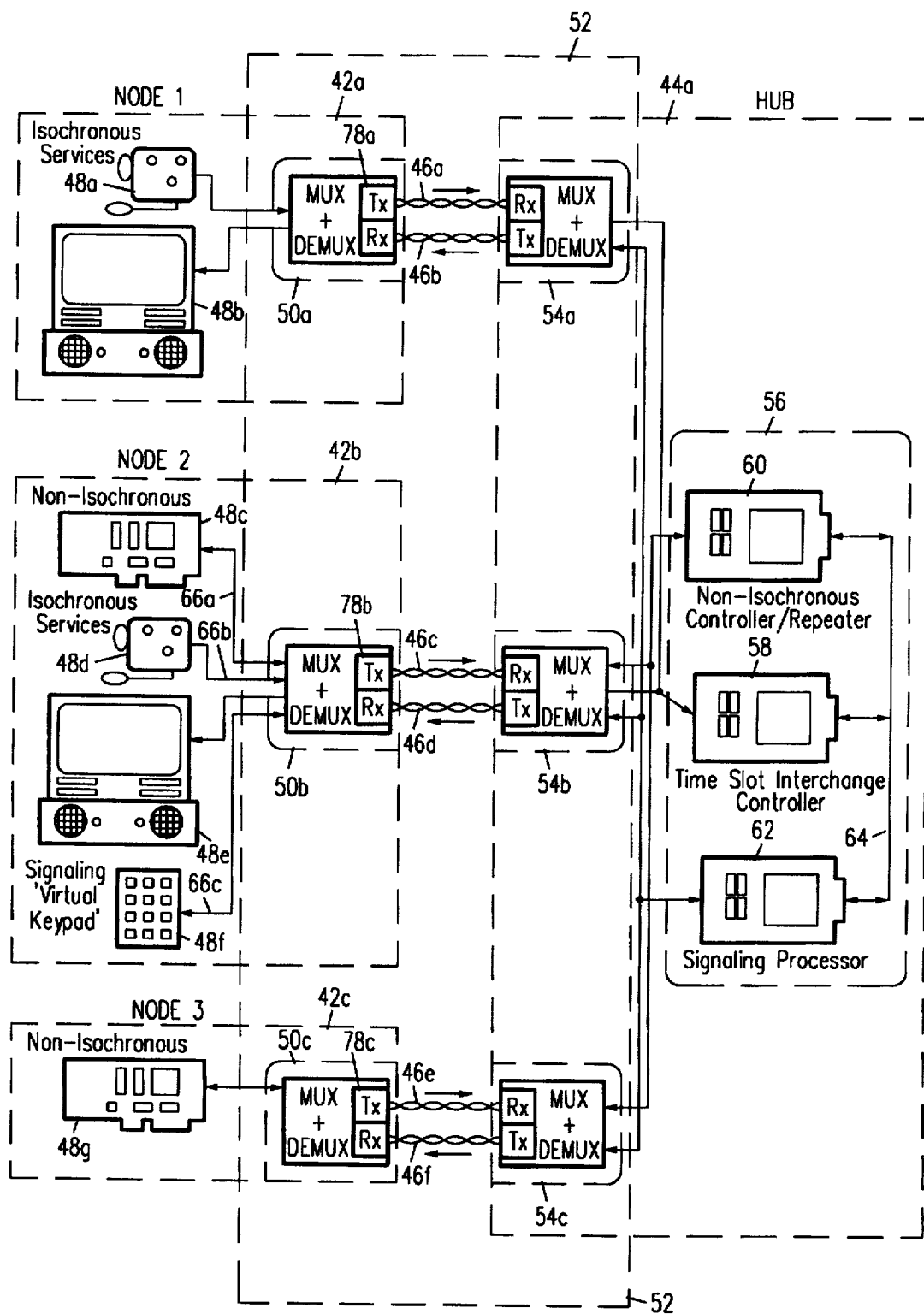
FIG. 2 is a schematic block diagram showing three nodes connecting to a hub card.

Before describing link endpoint capability detection, a general description of one type of network will be provided as one example of a data communication system in which the present invention can operate. A data communication system can be configured in a star-topology with a plurality of nodes 42a, 42b, 42c, (FIG. 2) each coupled to a hub 44a by data links comprising physical data transmission media such as one-way twisted pair wires 46a–46f. The number of nodes can be adjusted depending on the data transmission needs and objectives of the system. In one embodiment, each hub is configured to accommodate connection with up to 16 nodes. Each node 42a, 42b, 42c includes circuitry 50a, 50b, 50c for receiving data, converting it to a form suitable for transmission onto the physical media 46a, 46c, 46e and receipt of signals from the physical media 46b, 46d, 46f and conversion to a form suitable for use by the data sinks. Each of the nodes 42a, 42b, 42c includes data sources and sinks 48a–48g. The data sources and sinks can be isochronous sources and sinks such as video cameras 48a, 48d and monitors 48b, 48e, non-isochronous sources and sinks such as an ethernet media access controller 48c, 48g, and signaling or D channel sources and sinks such as an emulated or virtual key pad 48f provided, for example, on a personal computer (PC) terminal.

Each of the nodes 42a, 42b, 42c can include various types of sources and sinks such as strictly isochronous sources and sinks, such as depicted for node one 42a, strictly non-isochronous sources/sinks as depicted for node three 42c or both isochronous and non-isochronous sources and sinks as depicted for node two 42b. The physical layer 52 of the network system depicted in FIG. 2 includes the node data receivers and converters 50a, 50b, 50c, the physical media 46a–46f and the hub components 54a, 54b, 54c and 56.

Figure 3:
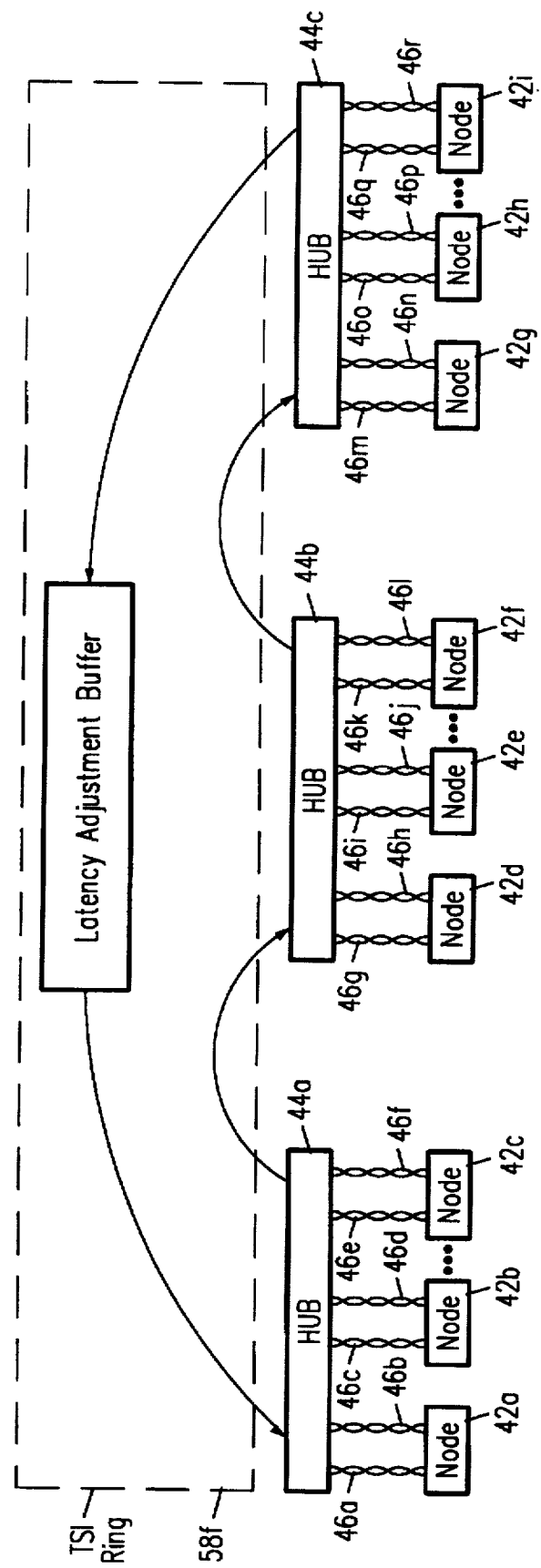
FIG. 3 is a schematic block diagram showing a number of hubs connected together using a ring structure.

The hub 44a includes circuitry 54a, 54b, 54c for receiving data from the physical media 46a, 46c, 46e separating the isochronous-sourced data from the non-isochronous-sourced data and the D channel and M channel data and converting separated data into a form suitable for handling by downstream hub circuitry 56. In the depicted embodiment the separated isochronous-sourced data is provided to a time slot interchange controller 58 for placing the data on a high-bandwidth bus (e.g. the TSI bus) so that it can be transported to destination nodes on other TSI controllers in the hub or other hubs (as depicted, e.g. in FIG. 3) and/or retrieved by hub circuitry 54a, 54b, 54c for transmission to various destination nodes 42a, 42b, 42c, e.g. by a local loopback capability. The separated non-isochronous data is provided to circuitry 60 configured to convey the non-isochronous data to one or more of the hub circuitry 54a, 54b, 54c for transmission to destination nodes 42a, 42b, 42c. In an embodiment in which non-isochronous-sourced data includes ethernet data, the hub circuitry 60 can be a standard ethernet repeater processor. In this way, the present invention can be at least partially backwards-compatible with previous ethernet hub systems. The D channel and M channel information is provided to a signaling processor 62 which performs various maintenance and control functions such as identifying and alerting users of error conditions, and setting up requested calls or connections, i.e. source/destination paths e.g. by communicating with the isochronous and non-isochronous controllers 58, 60, e.g. over data path 64. As depicted in FIG. 3, a number of star-topology systems can be interconnected by connecting hubs 44a, 44b, 44c to one another, e.g. by a time slot interchange (TSI) ring.

According to the present invention, data communication can be provided according to one or more of a number of protocols. Those skilled in the art are familiar with protocols, but in general, a "protocol" includes a standard set of rules that specify the format, timing, sequencing and/or error checking for data transmission. Several network protocols are referenced above, including an ethernet protocol such as 10BASE-T, an isochronous protocol such as FDDI-II, and a token ring protocol. Another possible protocol is one in which both isochronous and non-isochronous data are combined into a frame structure for transmission across physical media. A frame-structure protocol of this type is described in greater detail in commonly-assigned application Ser. No. 07/969,916, titled "Network for Data Communication with Isochronous Capability", now abandoned, filed on even date herewith and incorporated herein by reference. According to one such protocol, the incoming data from the various sources is provided to a multiplexer 70 (FIG. 4) which performs time-division multiplexing on a four-bit basis. The pattern for the time division multiplexing is a repeating series of frames or templates. In this embodiment, the frames are repeated every 125 microseconds. The time division multiplexing is a multiplexing of isochronous-sourced data and non-isochronous-sourced data. The non-isochronous-sourced data can be data provided in accordance with a number of previously-available LAN systems and this protocol will be referred to, in general, as "isochronous-LAN" protocol. Several particular types of isochronous-LAN protocols are possible. When the isochronous data is multiplexed with LAN data which is provided decoding to an ethernet protocol, such as a 10BASE-T ethernet protocol, the resulting time-division multiplexed protocol will be referred to as an "isochronous-ethernet" protocol. When the isochronous data is multiplexed with LAN data which is provided according to a token ring protocol, the resultant time multiplexed protocol will be referred to as an "isochronous-token ring" protocol.

The present invention will be described below by way of a particular example in which one available protocol is an isochronous-ethernet protocol and another potentially available protocol is a 10BASE-T protocol. However, as will be clear to those skilled in the art, the present invention can also be used in connection with other combinations of protocols such as isochronous-token ring or other isochronous-LAN protocols, pure isochronous protocols such as FDDI-II, and can include three or more protocols.

Table I depicts the manner in which the various data streams, and additional data and control bytes are time-division multiplexed in an isochronous-ethernet protocol. Each symbol in Table I represents four bits of data so that every group of two symbols represents one 8-bit byte of data. In Table I, E represents four bits of data from the ethernet stream 66b (FIG. 4), B designates four bits of data from the isochronous stream 66a, D represents four bits of data from the signaling or D channel stream 66c, and M represents four bits of M channel data stream 66d. In addition, certain byte-length patterns are provided. JK represents a frame synchronization pattern and EM (the first two bytes of block three in Table I) represents an ethernet "pad" followed by a maintenance byte. As seen in Table I, each frame contains 256 bytes which can be considered in thirty-two groups of eight bytes each, or four blocks of sixty-four bytes each. The frame structure is described more thoroughly in commonly-assigned application Ser. No. 07/969,911, Pat. No. 5,544,324, titled "Network for Transmitting Isochronous-Source Data with a Frame Structure", filed on even date herewith and incorporated herein by reference.

TABLE I

BLOCK 0:

| J | K | E | B | E | B | E | B | E | B | E | B | E | B | E | Group 0 |
|---|---|---|---|---|---|---|---|---|---|---|---|---|---|---|---|
| E | E | E | B | E | B | E | B | E | B | E | B | E | B | E | Group 1 |
| E | E | E | B | E | B | E | B | E | B | E | B | E | B | E | Group 2 |
| E | E | E | B | E | B | E | B | E | B | E | B | E | B | E | Group 3 |
| E | E | E | B | E | B | E | B | E | B | E | B | E | B | E | Group 4 |
| E | E | E | B | E | B | E | B | E | B | E | B | E | B | E | Group 5 |
| E | E | E | B | E | B | E | B | E | B | E | B | E | B | E | Group 6 |
| E | E | E | B | E | B | E | B | E | B | E | B | E | B | E | Group 7 |

BLOCK 1:

| M | M | E | B | E | B | E | B | E | B | E | B | E | B | E | Group 8 |
|---|---|---|---|---|---|---|---|---|---|---|---|---|---|---|---|
| E | E | E | B | E | B | E | B | E | B | E | B | E | B | E | Group 9 |
| E | E | E | B | E | B | E | B | E | B | E | B | E | B | E | Group 10 |
| E | E | E | B | E | B | E | B | E | B | E | B | E | B | E | Group 11 |
| E | E | E | B | E | B | E | B | E | B | E | B | E | B | E | Group 12 |
| E | E | E | B | E | B | E | B | E | B | E | B | E | B | E | Group 13 |
| E | E | E | B | E | B | E | B | E | B | E | B | E | B | E | Group 14 |
| E | E | E | B | E | B | E | B | E | B | E | B | E | B | E | Group 15 |

BLOCK 2:

| D | D | E | B | E | B | E | B | E | B | E | B | E | B | E | Group 16 |
|---|---|---|---|---|---|---|---|---|---|---|---|---|---|---|---|
| E | E | E | B | E | B | E | B | E | B | E | B | E | B | E | Group 17 |
| E | E | E | B | E | B | E | B | E | B | E | B | E | B | E | Group 18 |
| E | E | E | B | E | B | E | B | E | B | E | B | E | B | E | Group 19 |
| E | E | E | B | E | B | E | B | E | B | E | B | E | B | E | Group 20 |
| E | E | E | B | E | B | E | B | E | B | E | B | E | B | E | Group 21 |
| E | E | E | B | E | B | E | B | E | B | E | B | E | B | E | Group 22 |
| E | E | E | B | E | B | E | B | E | B | E | B | E | B | E | Group 23 |

BLOCK 3:

| E | M | E | B | E | B | E | B | E | B | E | B | E | B | E | Group 24 |
|---|---|---|---|---|---|---|---|---|---|---|---|---|---|---|---|
| E | E | E | B | E | B | E | B | E | B | E | B | E | B | E | Group 25 |
| E | E | E | B | E | B | E | B | E | B | E | B | E | B | E | Group 26 |
| E | E | E | B | E | B | E | B | E | B | E | B | E | B | E | Group 27 |
| E | E | E | B | E | B | E | B | E | B | E | B | E | B | E | Group 28 |
| E | E | E | B | E | B | E | B | E | B | E | B | E | B | E | Group 29 |
| E | E | E | B | E | B | E | B | E | B | E | B | E | B | E | Group 30 |
| E | E | E | B | E | B | E | B | E | B | E | B | E | B | E | Group 31 |

JK = Frame Synchronization Pattern
EM = Ethernet Pad & 4 Maintenance Bits
MM = 8 Maintenance Bits
E = Ethernet Packet Channel
D = D Channel
B = Isochronous Channel The time-multiplexed data is then encoded by an encoder 72. In the depicted embodiment, the encoder performs four/five encoding. One particular form of four/five encoding conforming partially to the ANSII X3T9.5 standard, is depicted in Table II. The encoding scheme depicted in Table II is described in greater detail in commonly-assigned application Ser. No. 970,329, titled "Frame-Based Transmission of Data", filed on even date herewith and incorporated herein by reference.

TABLE II

| Symbol | Encoded (5 bit) | Decoded (4 bit) | Description |
|---|---|---|---|
| 0 | 11110 | 0000 | Data 0 |
| 1 | 01001 | 0001 | Data 1 |
| 2 | 10100 | 0010 | Data 2 |
| 3 | 10101 | 0011 | Data 3 |
| 4 | 01010 | 0100 | Data 4 |
| 5 | 01011 | 0101 | Data 5 |
| 6 | 01110 | 0110 | Data 6 |
| 7 | 01111 | 0111 | Data 7 |
| 8 | 10010 | 1000 | Data 8 |
| 9 | 10011 | 1001 | Data 9 |
| A | 10110 | 1010 | Data A |
| B | 10111 | 1011 | Data B |
| C | 11010 | 1100 | Data C |
| D | 11011 | 1101 | Data D |
| E | 11100 | 1110 | Data E |
| F | 11101 | 1111 | Data F |
| I | 11111 | 1010 | No Ethernet Carrier |
| S | 11001 | 0111 | No Ethernet Data |
| V | 01100 | 0010 | Unaligned Data |
| T | 01101 | 0101 | Unassigned |
| J | 11000 | 1101 | Frame Sync Part 1 |
| K | 10001 | 1101 | Frame Sync Part 2 |
| Q | 00000 | 0010 | Invalid |
| H | 00100 | 0001 | Invalid |
| R | 00111 | 0110 | Invalid |
| V | 00001 | 0110 | Invalid |
| V | 00010 | 0010 | Invalid |
| V | 00011 | 0010 | Invalid |
| V | 00101 | 0010 | Invalid |
| V | 00110 | 0010 | Invalid |
| V | 01000 | 0010 | Invalid |
| V | 10000 | 0010 | Invalid |

The output from the encoding devices is sent to pre-emphasis circuitry 76. The pre-emphasis circuitry compensates the signal transmitter onto the physical medium to reduce the jitter. The data output by the pre-emphasis circuitry 76 is sent to a transmitter or driver 78b and the signal is transmitted over the physical medium 46c. The physical medium 46c can be any of a number of media types including twisted pair, coaxial or fiber optic cable.

Figure 4:
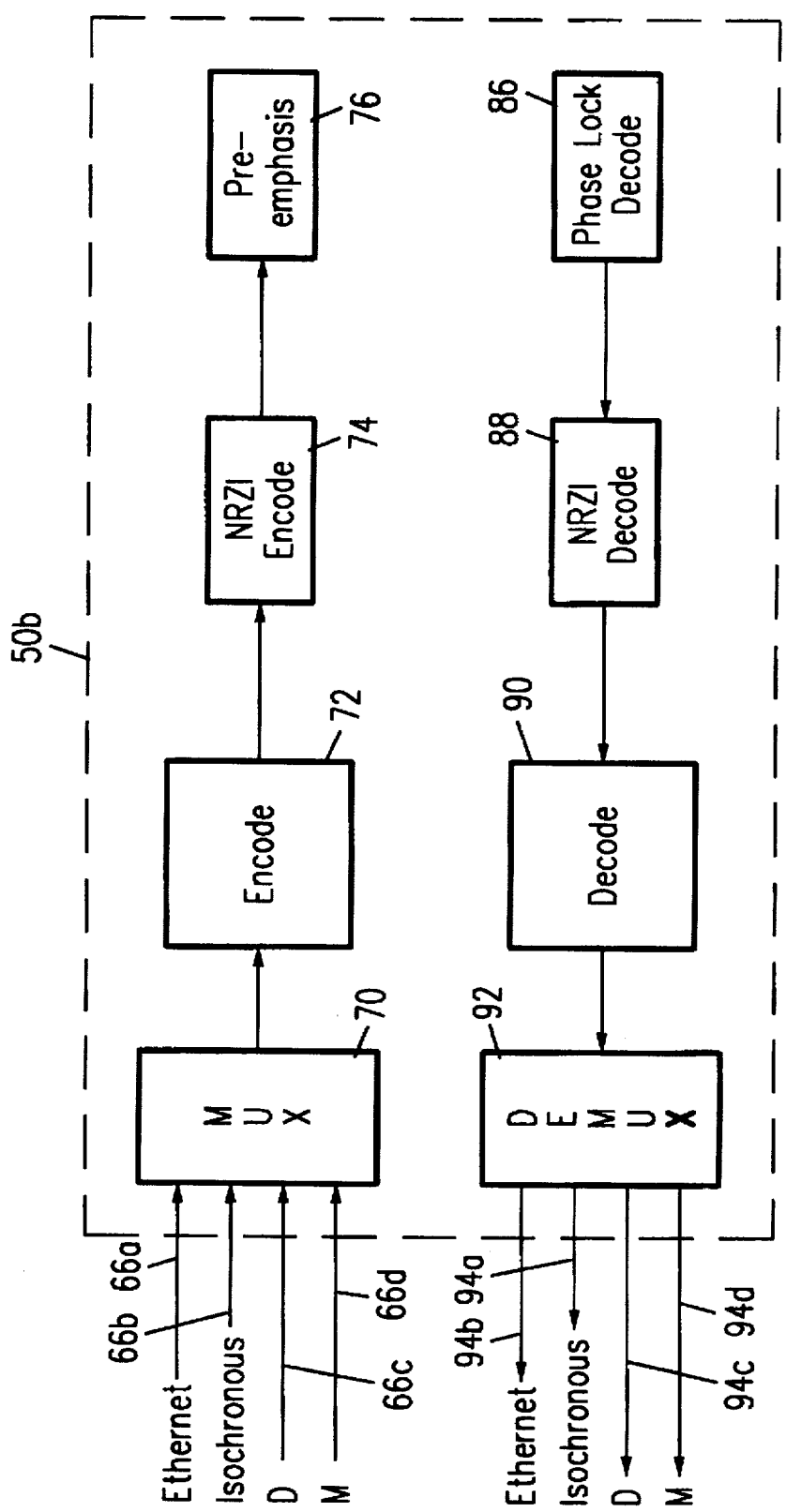
FIG. 4. is a schematic block diagram of node circuitry for multiplexing and preparing data for transmission over the media and for receiving information from the media and demultiplexing the data.
Figure 5:
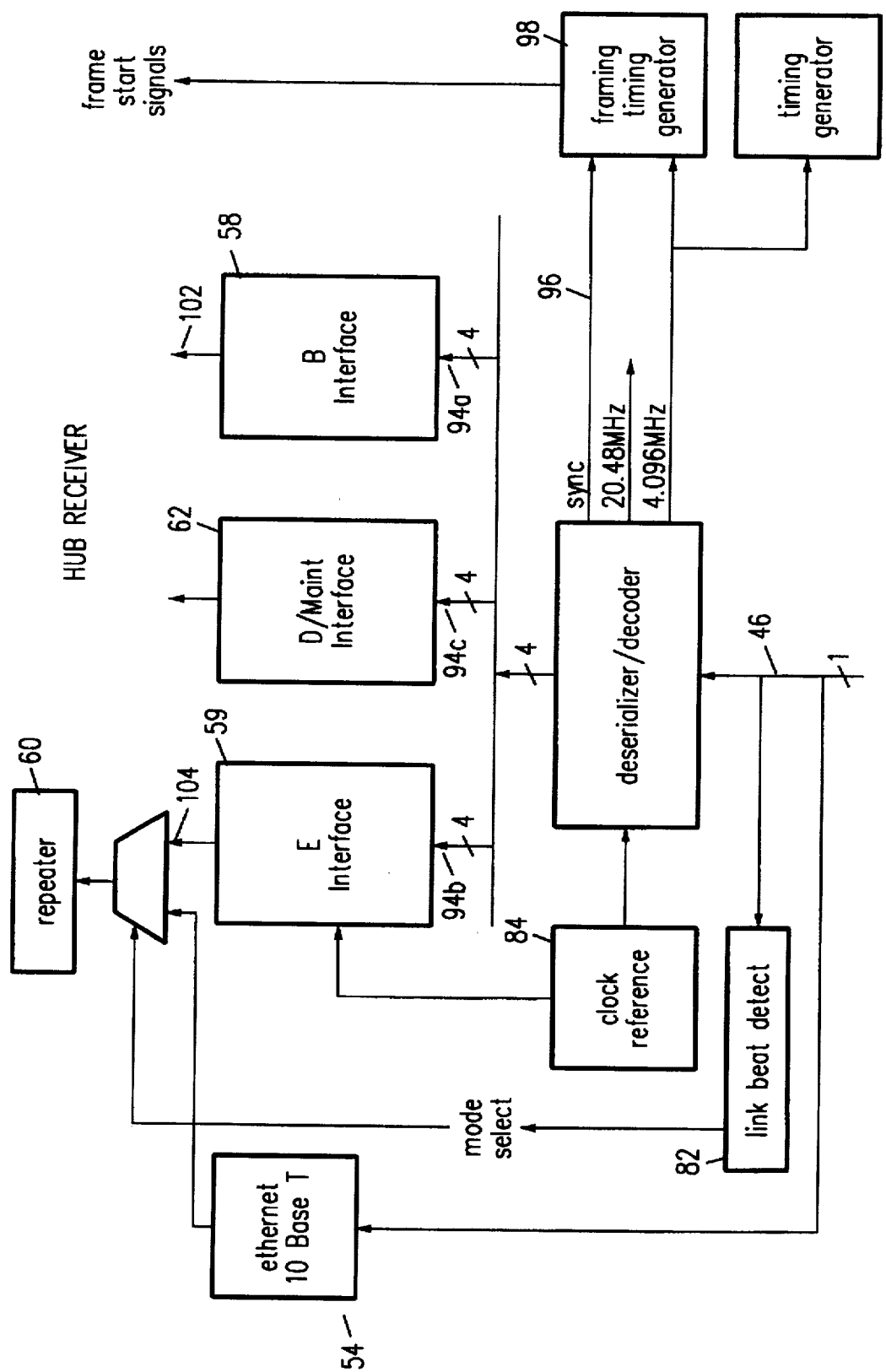
FIG. 5. is a schematic block diagram of hub receiver circuitry according to an embodiment of the present invention.

The data sent over the physical media 46a is received in the hub 44a. The hub contains a plurality of circuit devices 54a, 54b, 54c, each one coupled to one of the nodes 42a, 42b, 42c by the physical media 46. As depicted in FIG. 5, the data transmitted over the physical media 46 arrives serially at a de-serializer/decoder 80. Link detect circuitry 82 also receives the data from the physical media 46 for detection of the mode or protocol in which the node is operating as described more fully below. The de-serializer/decoder 80 receives a reference clock signal 84. The de-serializer/decoder includes circuitry which is functionally an inverse of the multiplexing/encoding circuitry described above. Referring to FIG. 4, the de-serializer/decoder 80 includes phase lock decode circuitry 86, the results of which are provided to NRZI decode circuitry 88 which, in turn, provides the decode results to four/five decode circuitry 90, in turn providing results to a de-multiplexer 92 which separates the received data into the isochronous-sourced data 94a the non-isochronous-sourced data 94b and signaling data, such as D channel and M channel data 94c. The de-serializer/decoder 80 also outputs a synchronization signal, derived from the JK frame synchronization symbols 96 for use by a framing timing generator 98.

Both the non-isochronous-sourced data 94b and the isochronous-sourced data 94a are made available to the various hub circuitry components 54a, 54b, 54c, as needed for transmission back to destination nodes. In one embodiment, the separated isochronous data 94a and non-isochronous data 94b are reconfigured by the respective interfaces 58, 59 to provide isochronous output 102 and non-isochronous output 104 in a form suitable for processing so as to provide the data as needed for transmission to the destination nodes. In one embodiment, the non-isochronous data 94b can be configured by the E interface 59 so that the output data 104 can be processed by a repeater device 60 for provision to hub circuitry 54 and eventual transmission to destination nodes. As an alternative to using a repeater for the non-isochronous data, packet connections may be linked through media access control layer bridges. Preferably, the output data 104 is in a form such that it can be handled by repeater circuitry of types previously available. For example, when the non-isochronous data 94b is data which originated at the node 42b from an ethernet MAC, the output data 104 is in a form such that it can be handled by a standard ethernet hub repeater 60 such as DP83950 "Repeater Interface Controller" (RIC) available from National Semiconductor Corporation, Santa Clara, Calif.

As shown in FIG. 5, the data received over the physical link 46 is also provided to an additional interface for handling data according to a second protocol, as described more thoroughly below. For example, when the second protocol is an ethernet 10BASE-T protocol, a 10BASE-T interface 512 can be provided. The 10BASE-T receive interface 512 can be a standard 10BASE-T interface, such as model DP83922 Twisted Pair Transceiver Interface (TPI) available from National Semiconductor Corporation, Santa Clara, Calif. A multiplexer 514 determines whether the repeater 60 receives a data stream from the E interface 59 or the 10BASE-T interface 512. This selection by the multiplexer 514 is controlled by a mode select signal output over control line 516 from the link beat detect circuit 82 as described more fully below.

Figure 6:
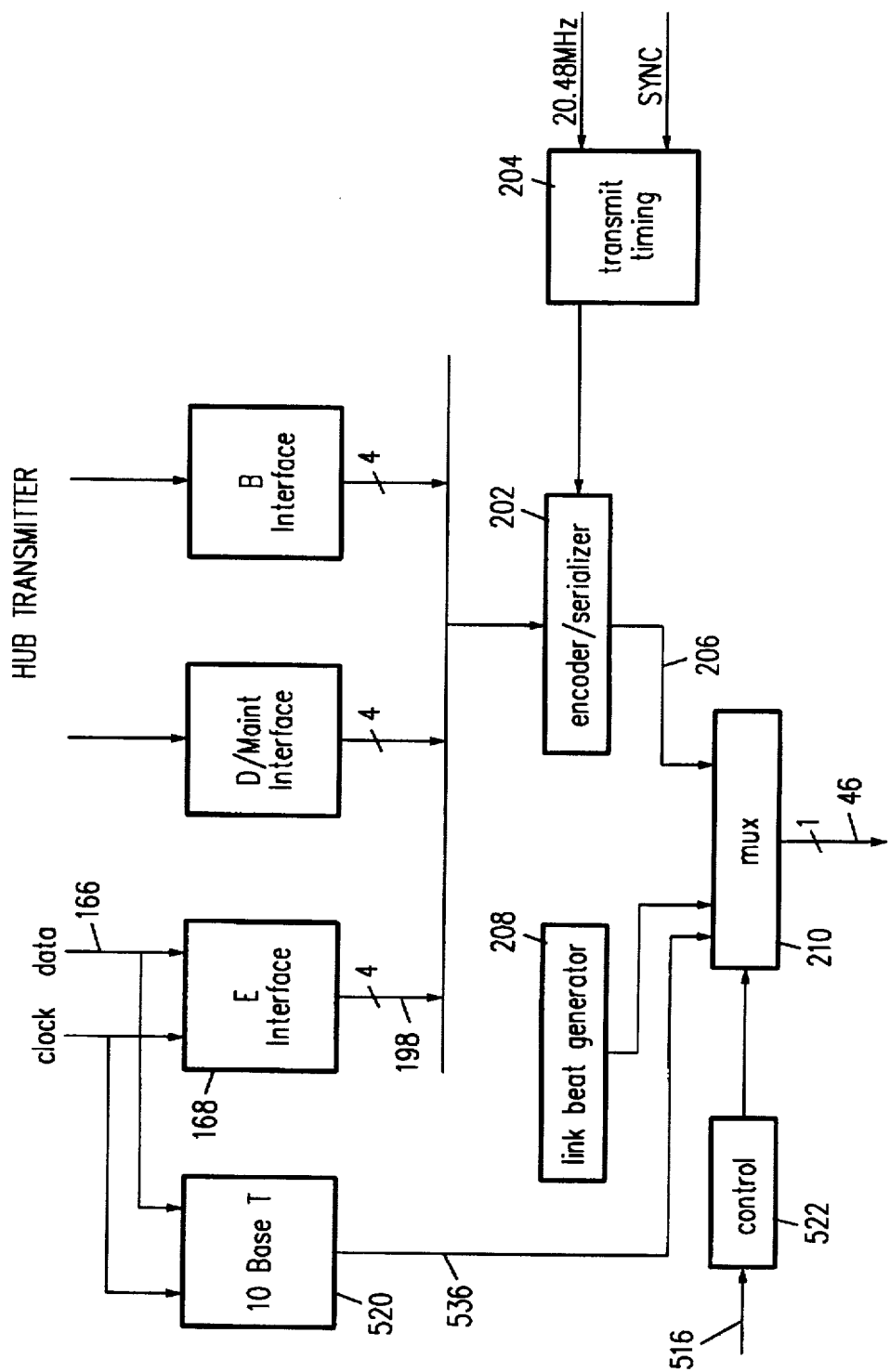
FIG. 6 is a schematic block diagram of a hub transmitter circuitry.

The data 198 output from the E transmit interface 168 is provided along with isochronous data output 164 and M channel and D channel data 170 to encoder serializer circuitry 202, as depicted in FIG. 6. The encoder/serializer 202 is configured substantially like the encoding circuitry found in the node and depicted in FIG. 4. Specifically, the encoder/serializer 202 provides a multiplexer for combining the three streams of data 198, 170, 164, a four/five encoder, an NRZI encoder, and pre-emphasis circuitry. The timing of transmission is controlled by transmit timing circuitry 204. Output 206 from the encoder/serializer is selectively combined with link beats from a link beat generator 208 by multiplexer 210 for purposes of link end point detection, as described below. The clock signal and the data 166 from the repeater 60, in addition to being provided to the E interface 168 is also provided to a second interface which operates according to a second protocol. When a second protocol is an ethernet 10BASE-T protocol, the interface is an ethernet 10BASE-T interface 520. The ethernet 10BASE-T interface transmit 520 can be of a type substantially identical to 10BASE-T interfaces provided previously in apparatus such as model DP83922 Twisted Pair Transceiver Interface (TPI), available from National Semiconductor Corporation, Santa Clara, Calif. The output from the ethernet 10BASE-T interface 520 is provided to the multiplexer 210. Multiplexer 210 is able to select, in response to a control signal 522, whether to output data originating from the repeater 60 according to a first protocol determined by the E interface 168, or according to a second protocol determined by the ethernet 10BASE-T interface 520, as described more fully below. The data sent from the hub 44a to the nodes 42 is sent in a frame format which is preferably substantially the same as the frame format used for the data sent from the nodes 48 to the hub 44a as described above. At the nodes 42, the circuitry 50 includes devices (FIG. 4) for decoding and de-multiplexing data, similar to that described for performing these functions in the hub, mainly a phase lock decode 86, and NRZI decode 88, a four/five decode 90, and a de-multiplexer 92. Decoded and de-multiplexed data is then delivered to the various data sinks in the nodes 42.

Figure 7:
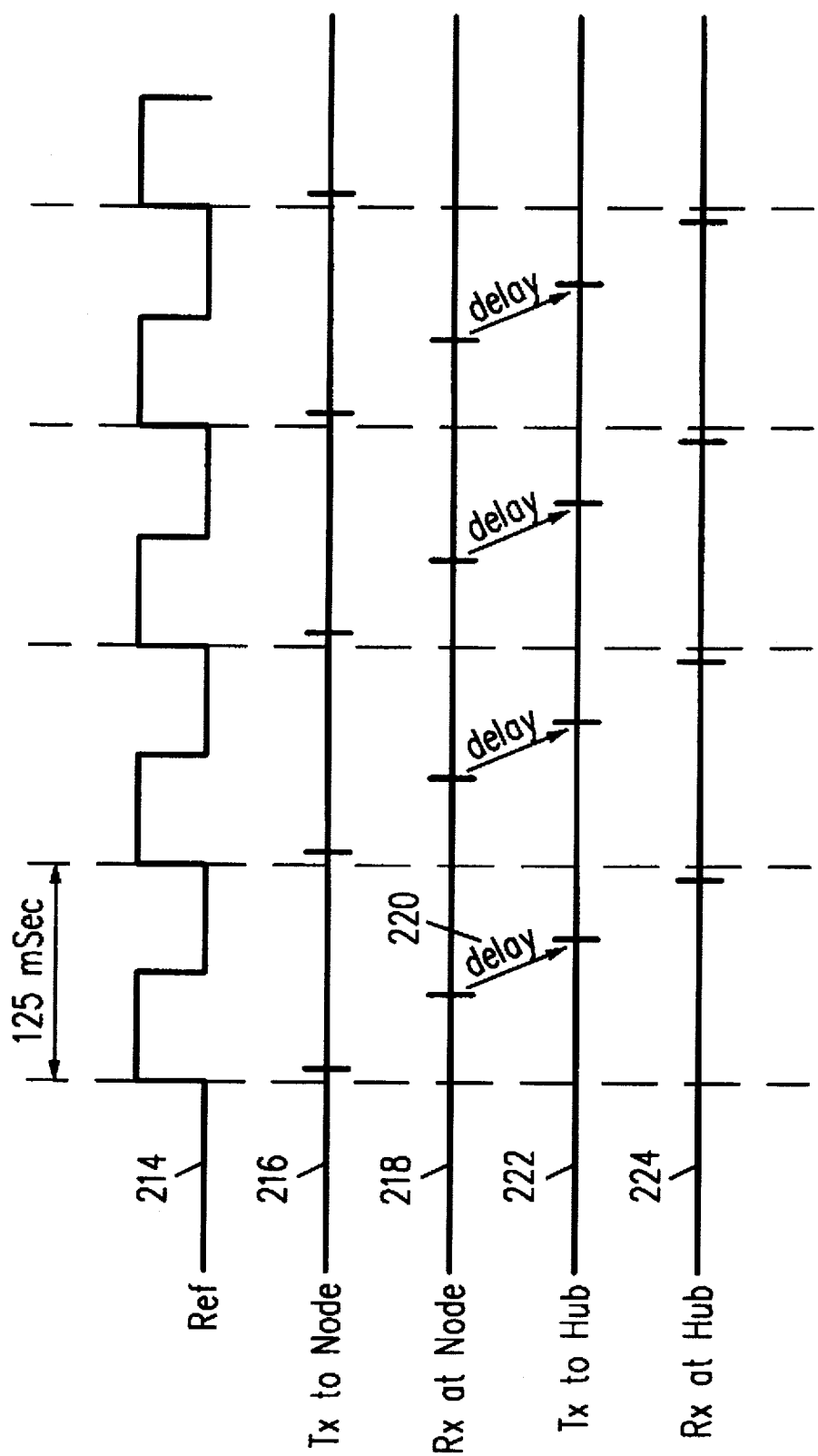
FIG. 7 is a timing diagram showing the relative timing of transmissions and receptions at the hub and nodes.

As shown in FIG. 7, the timing of the system can be synchronized with a 125 microsecond reference clock signal 214. In this example, the reference signal 214 provides an ascending clock edge every 125 microseconds. The reference signal can be provided by any of a number of sources. Preferably, an embodiment of the present invention is configured to permit a reference signal 214 to be synchronized to an external clock reference, such as a reference signal from a wide area network or from a FDDI-II ring. The reference signal can be supplied through one of the nodes and transmitted to the hub for distribution to the other nodes, or can be supplied directly to the hub for distribution.

Figure 8:
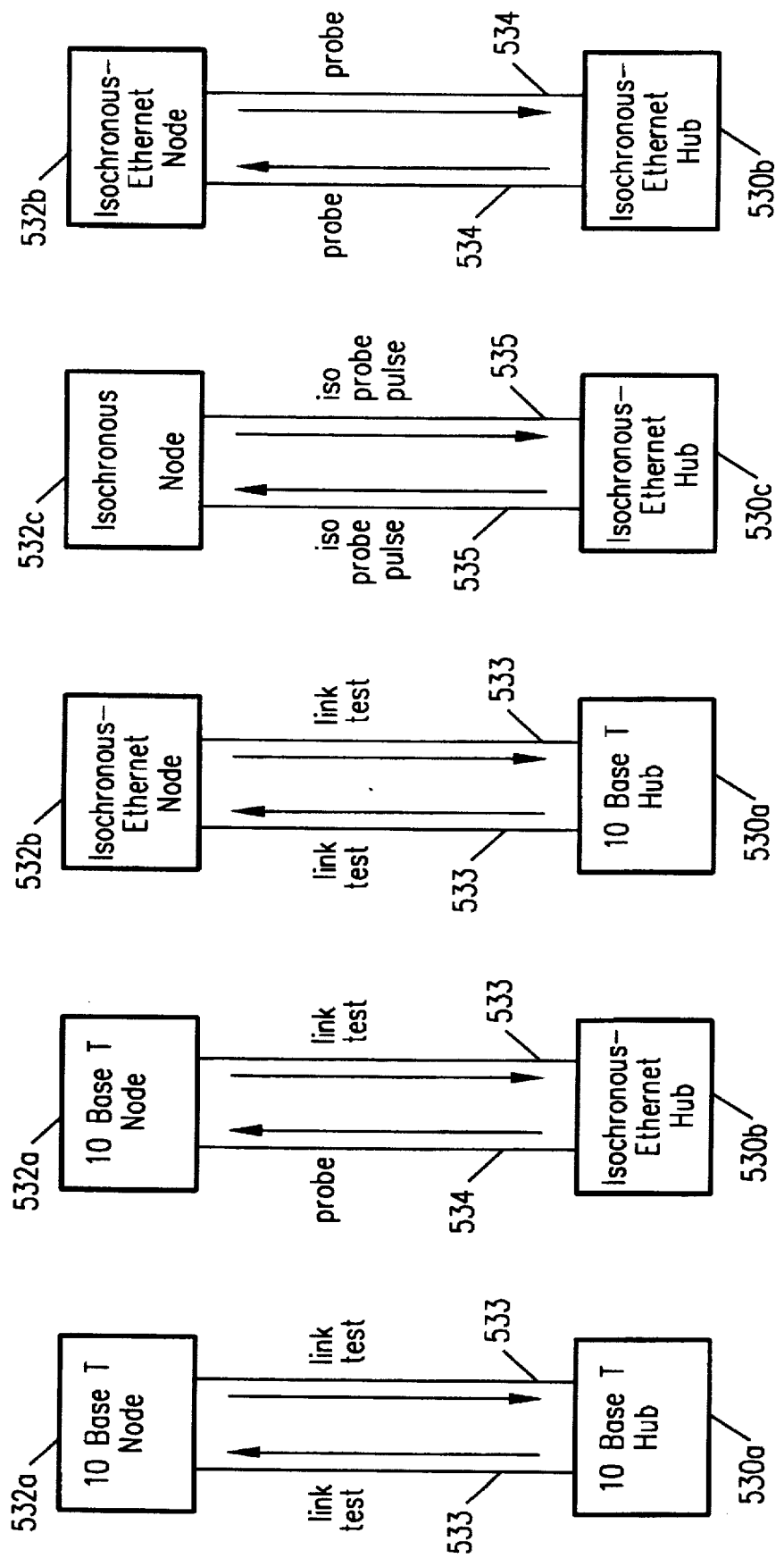
FIGS. 8A–8E are block diagrams depicting link endpoint capability detection for five different network configurations according to embodiments of the present invention.

FIG. 8A depicts a network configuration in which the hub 530a is a 10BASE-T hub and the node 532a is a 10BASE-T node, both of which are found in previously-available devices. In this system, the 10BASE-T hub sends a hub protocal signal, specifically a link test pulse, in accordance with IEEE Standard 802.3, over the physical medium to a 10BASE-T node 532a. In a typical system, the 10BASE-T hub outputs a hub protocal signal upon being powered-up. The link test pulse used in previous devices is described in IEEE Standard 802.3. Briefly, a link test pulse can be described as a series of single 100 nonosecond pulses occurring at a nominal 16 millisecond interval. The 10BASE-T node 532a, typically in response to being powered-up, outputs onto the physical medium a node protocal signal, which, in accordance with IEEE 802.3, is substantially identical to the above-described link test pulse. This link test pulse is received by the 10BASE-T hub 530a. At this point, a 10BASE-T hub proceeds to operate on the basis that it is connected to a 10BASE-T node (532a) and the node 532a begins to operate on the basis that it is connected to a 10BASE-T hub (530a) and normal 10BASE-T communication proceeds.

FIG. 8B depicts a configuration according to one embodiment of the present invention in which an isochronous-ethernet hub 530b is connected to a 10BASE-T node 532a. The isochronous-ethernet hub outputs a hub protocal signal, specifically a probe signal 534. A probe signal differs from the link test pulse in that it has a faster link beat, for example having a beat period of less than about 2 milliseconds. The 10BASE-T node 532a is configured substantially identically to previously available 10BASE-T nodes. Upon receipt of the probe pulse 534, it continues to output a link test pulse onto the physical medium as its node protocal signal. The isochronous-ethernet hub 530b, upon receiving a link test pulse (rather than a probe pulse) can determine, on that basis, that the apparatus connected to the far end of the physical medium is a 10BASE-T node 532a (rather than, for example, an isochronous-ethernet node). Preferably, the isochronous-ethernet hub 530b is capable of handling data either according to an isochronous-ethernet protocol or a 10BASE-T protocol. Upon receiving a link test pulse and determining that the node 532a is a 10BASE-T node, the isochronous- ethernet hub 530b will configure itself to conduct all future communications with node 532a using a 10BASE-T protocol.

Although FIG. 8B shows only a single node 532a connected to the hub 530b, in a typical configuration, a plurality of nodes will be connected to each hub. Preferably, the hub 530b is capable of using different protocols with different nodes. Accordingly, an isochronous-ethernet hub which is connected to both a 10BASE-T node and an isochronous-ethernet node can determine the capability of each node which it is connected by observing the node protocal signal and can use the appropriate protocol for each node.

FIG. 8C depicts a network configuration in which a 10BASE-T hub 530a is connected to an isochronous-ethernet node 532b. Upon initialization of the system the 10Base-T hub outputs a link test pulse 533 as its hub protocal signal. In the depicted embodiment the isochronous-ethernet node 532b can operate according to an isochronous-ethernet protocol. Therefore, upon receiving the link test pulse 533, it outputs a link test pulse 533. Accordingly, the 10BASE-T hub 530a can only send ethernet data and no isochronous data.

FIG. 8D depicts a network configuration in which an isochronous-ethernet hub 530c is connected to an isochronous node 532c. In the embodiment depicted in FIG. 8D, the node 532c only has isochronous protocol capability, but the hub 530c has both an isochronous-ethernet protocol capability and an isochronous protocol capability. In this embodiment, upon initialization of the system, the hub 530c outputs an isochronous probe pulse 535 as its hub protocal signal. The isochronous node 532c, upon receiving the isochronous probe pulse 535, can determine that the hub to which it is attached is an isochronous-capability hub and will configure itself to conduct all future communications with the hub 530c according to an isochronous protocol. Thus, the isochronous node 532c preferably contains isochronous apparatus similar to apparatus found in the hub 530c for detecting circuitry at the other end of the link or physical medium and, thereafter, using the appropriate protocol. The isochronous node 532c, in response to receipt of the iso probe pulse 535, outputs an iso probe pulse 535 as its node protocal signal. The hub 530c, upon receipt of the iso probe pulse, will commence normal isochronous hub operations.

FIG. 8E depicts a configuration in which an isochronous-ethernet hub 530b is connected to an isochronous-ethernet node 532b. When the system is initialized the isochronous-ethernet hub 530b outputs a probe signal such as an isoEnet probe, on the physical medium as its hub protocal signal. When the isochronous-ethernet node 532b receives the isoEnet probe signal it is able to determine that the hub to which it is connected is an isochronous-ethernet hub. The isochronous-ethernet node 532b then outputs an isoEnet probe signal 534 onto the physical medium as its node protocal signal which is received by the isochronous ethernet hub 530b. When the isochronous-ethernet hub 530b receives an isoEnet probe signal it can determine that the node 532b to which it is connected is an isochronous-ethernet node and will conduct all future communications with this particular node according to the isochronous-ethernet protocol.

FIGS. 5 and 6 depict components in the hub which are used in connection with link endpoint capability detection.

As depicted in FIG. 6, a link beat generator 208 is provided for outputting the appropriate hub probe signal. A control signal 522 controls the multiplexer 210 so that the probe signal 208 is output onto the physical medium 46 at the appropriate time, e.g., upon initialization of the network system.

Figure 9:
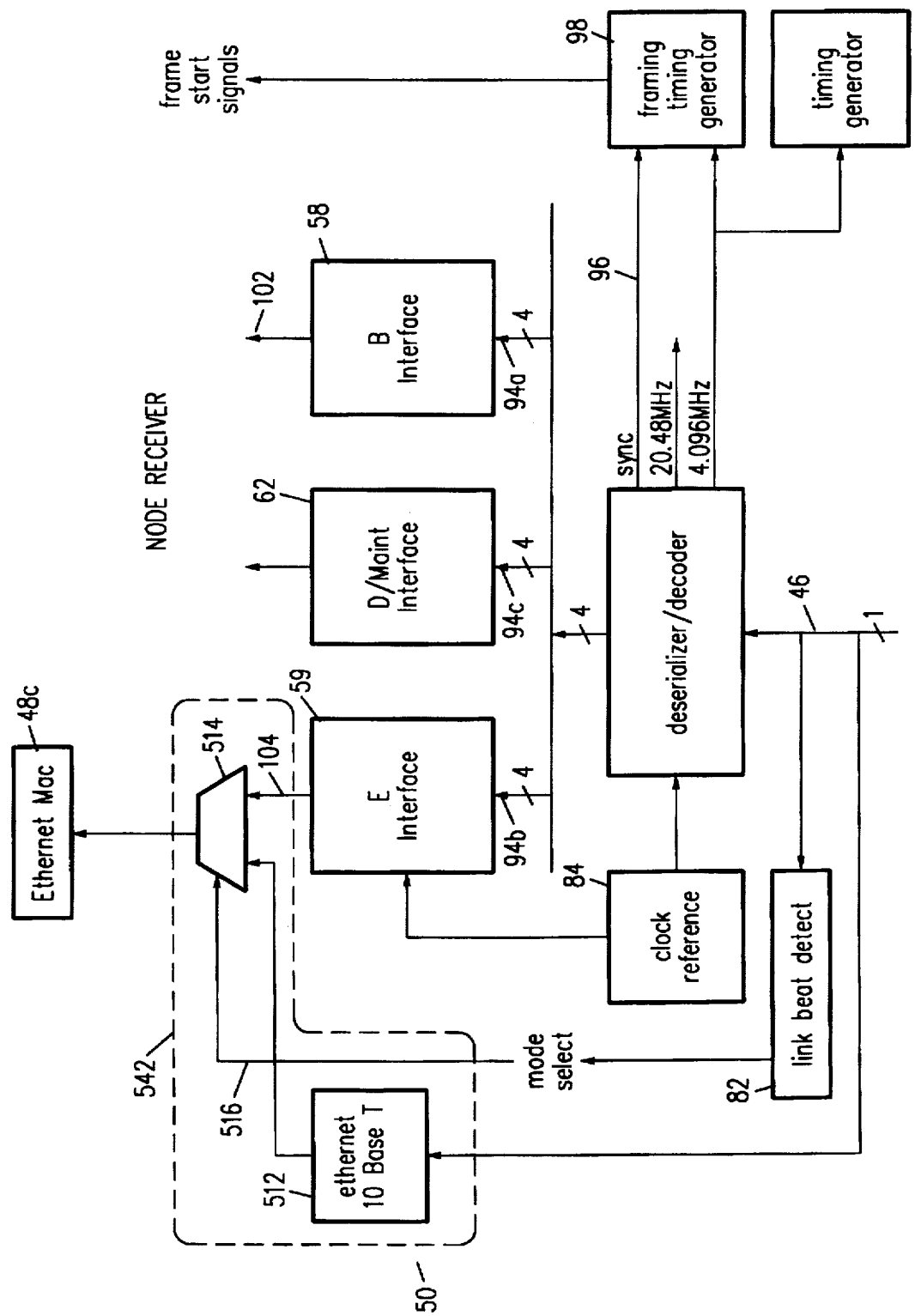
FIG. 9 is a block diagram of a node receiver, according to an embodiment of the present invention.

FIG. 9 depicts circuitry 50 in an isochronous-ethernet node. Circuitry 542 would be provided in a node which can operate in accordance with two protocols. Nodes which provide only a single protocol would not include circuitry 542 and the E interface 59 would be connected directly to the ethernet MAC 48c. The node protocal signal received over the physical medium 46 is detected by the link beat detector circuitry 82. Circuitry 82 can include, for example a state machine, for detecting the sequence and interval of the pulse or link test pulse. The link beat detector circuitry 82 outputs a mode select signal 516 for controlling the multiplexer 514. The control signal 516 is configured to set the multiplexer 514 such that the ethernet MAC 48C is connected to the output of the isochronous-ethernet interface 59 so that future data received over the physical medium 46 is treated in accordance with the isochronous-ethernet protocol. If the link beat detector 82 detects the link test pulse rather than an iso pulse signal, it outputs a mode select signal 516 which configures the multiplexer 514 to connect the ethernet MAC 48C with the ethernet 10BASE-T interface 512 so that future data received over the physical medium is treated in accordance with ethernet 10BASE-T protocol. The mode select signal 516 also provides a signal to a control circuit in a node transmitter. The node transmitter is not separately depicted in detail since it is substantially identical to the hub transmitter depicted in FIG. 6.

The node transmitter control 522 in response to the mode select signal 516 (indicating receipt of a link test pulse or other probe pulse) configures the multiplexer to output an appropriate node protocal signal from the link beat generator 208 onto the medium 46. In some embodiments, nodes and/or hubs are configured to output a link test pulse or a probe pulse (depending on the capability of the hub or node), whenever the hub or node is powered-up. For embodiments in which the link beat detect 82 is able to discriminate between a link test pulse and a probe signal such as an iso probe pulse, the mode select 516 can configure the link beat generator 208 to output a link test pulse in response to a link test pulse and an iso probe pulse in response to a probe signal. The signal output by the node transmitter is received in the hub receiver 54 (FIG. 5). The hub receiver link beat detect circuitry 82 detects the output of the node protocal signal from the node transmitter. When the signal is a probe signal, circuitry 82 outputs a mode select signal 516 which is effective to control the multiplexer 514 to connect the output from the E interface 59 to the repeater 60. In this way, the hub receiver is now configured to process future signals received from the node over medium 46 according to an isochronous-ethernet protocol. The node select signal 516 also provides an input to control signal 522 which, in response, configures the multiplexer to place the output 206 from the encoder/serializer 202 onto the physical medium 46, rather than using the output from the 10BASE-T interface 536. In this way, the transmitter is now configured to output data according to the isochronous-ethernet protocol.

If the signal output from the node is a link test pulse rather than probe pulse, the link beat detector 82 outputs a mode select signal 516 which configures multiplexer 514 to connect the ethernet 10BASE-T interface 512 with repeater 60 and configures the multiplexer to send output 536 onto the physical medium 46, rather than output 206.

In view of the above description, a number of advantages of the present invention can be seen. The present invention allows a network to be configured in a mixed protocol or mixed environment, with, for example, a single hub connected to a plurality of nodes which operate according to different protocols, with the configuration being achieved automatically, without the need for manually establishing a predetermined protocol beforehand for each node. The present invention permits networks to be upgraded incrementally so that it is not necessary to upgrade all nodes at the same time. Furthermore, it is not, in general, necessary for service personnel to specifically configure nodes or hubs to accommodate particular protocols since the protocols are determined automatically and the nodes and hub configure themselves in accordance with the determined protocols.

A number of variations and modifications of the present invention can be used. Although an embodiment involving a 10BASE-T protocol and an isochronous-ethernet protocol was described, the present invention is equally applicable to other protocols including other LAN protocols such as a token ring protocol, an isochronous protocol and the like. Although the present invention described one particular signal characteristic used for determining the protocol, other characteristics could also be used. For example, a token ring connection could be detected by the presence of four or 16 Mbit/sec Manchester-encoded data. Other LANs can be detected by their unique timing and data patterns. Protocols could also be detected using such characteristics as the pattern of the presence or absence of a carrier, and the frequency spectrum of signals placed onto the physical medium. When a node has a capability of communicating under two or more protocols, e.g. either an isochronous-ethernet protocol or a pure ethernet protocol, it would be possible for a hub to use both capabilities of a node, i.e., to communicate according to a first protocol during a first time period and a second protocol during a second time period. Although the present invention has been described in the context of a star topology, the invention could also be used in a non-star topology, such as a ring topology or a tree topology. The present invention can be used in networks which do not have a hub, such as direct connections between two nodes with each node determining the protocol capabilities of the other node. As described above, the link test pulse and iso probe signals are related in that, for example, a 10BASE-T node will respond in the same fashion to receipt of either type of pulse. However, the test signals could be provided in forms which are unique to each type of protocol. In such a system, a data source/sink would output a first type of test pulse or other signal and, if no response was received, would output a second type of test pulse or signal, and so forth until a response was received indicating the protocol capability at the other end of the link. A data source/sink could be configured to determine all possible protocol capabilities of the apparatus at the other end of the link, rather than determining the "highest" or "best" capability available or using the first capability detected. The devices at each end could select a protocol capability other than the "highest" or "best" capability. It would be possible for a node to store an indication of its capabilities, such as in a table or other memory device, and to output the information upon receiving an inquiry. It would also be possible for a network to initialize in a common protocol, e.g., a 10BASE-T protocol, and, thereafter, exchange information, using that protocol, indicating additional protocol capabilities of the components of the system. Thereafter, the systems could reconfigure themselves to use desired ones of the available protocols.

Although the present invention has been described by way of preferred embodiments and certain variations and modifications, other variations and modifications can also be used, the invention being defined by the following claims.

What is claimed is:

1. In a data communication network comprising a hub coupled to at least one node, an apparatus for establishing communication between the hub and a node comprising:

a hub transmitter coupled to the hub for transmitting a hub protocol signal to the node, the hub protocol signal indicating a communication protocol, including a format for a data transmission, with which the hub is capable of communicating;

a node receiver coupled to the node for receiving the hub protocol signal;

a node transmitter coupled to the node for transmitting a node protocol signal to the hub, the node protocol signal indicating a communication protocol, including a format for a data transmission, with which the node is capable of communicating;

wherein the communication protocol indicated by the node protocol signal is different from the communication protocol indicated by the hub protocol signal;

a hub receiver coupled to the hub for receiving the node protocol signal;

a protocol identifying circuit coupled to the hub receiver for identifying the communication protocol indicated by the node protocol signal from among a plurality of possible communication protocols with which the hub is capable of communicating; and wherein the hub transmitter includes a communication circuit for communicating with the node using the communication protocol indicated by the node protocol signal in response thereto.

2. The apparatus according to claim 1 wherein the hub receiver includes frame receiving circuitry for receiving data formatted in a frame structure, and packet receiving circuitry for receiving data formatted in a packet structure and wherein the received data formatted in the frame structure and the received data formatted in the packet structure are received over the same receiving communication path, and wherein the hub transmitter includes frame transmitting circuitry for transmitting data formatted in the frame structure, and packet transmitting circuitry for transmitting data formatted in the packet structure, wherein the data formatted in the frame structure and the data formatted in the packet structure are transmitted over the same transmitting communication path.

3. The apparatus according to claim 2 wherein the hub protocol signal comprises a signal indicating a protocol corresponding to data formatted in the frame structure, and wherein the node protocol signal comprises a signal indicating a protocol corresponding to data formatted in the packet structure.

4. The apparatus according to claim 2 wherein the node protocol signal indicates an ethernet protocol, and wherein the data formatted in the packet structure is formatted according to the ethernet protocol.

5. The apparatus according to claim 2 wherein the node protocol signal indicates a token-ring protocol, and wherein the data formatted in the packet structure is formatted according to the token-ring protocol.

6. The apparatus according to claim 2 wherein the frame receiving circuitry includes packet converting circuitry for converting received data formatted in the frame structure into data formatted in a packet structure.

7. The apparatus according to claim 6 wherein the node protocol signal indicates an ethernet protocol, and wherein the data formatted in the packet structure is formatted according to the ethernet protocol.

8. The apparatus according to claim 6 wherein the node protocol signal indicates a token-ring protocol, and wherein the data formatted in the packet structure is formatted according to the token-ring protocol.

9. The apparatus according to claim 1 wherein the hub receiver includes frame receiving circuitry for receiving data formatted in a frame structure, and isochronous receiving circuitry for receiving data formatted in an isochronous structure, wherein the received data formatted in a frame structure and the received data formatted in the isochronous structure are received over the same receiving communication path, and wherein the hub transmitter includes frame transmitting circuitry for transmitting data formatted in a frame structure, and isochronous transmitting circuitry for transmitting data formatted in an isochronous structure, wherein the data formatted in the isochronous structure and the data formatted in the frame structure are transmitted over the same transmitting communication path.

10. The apparatus according to claim 9 wherein the hub protocol signal comprises a signal indicating a protocol corresponding to data formatted in the frame structure, and wherein the node protocol signal comprises a signal indicating a protocol corresponding to data formatted in the isochronous structure.

11. The apparatus according to claim 9 wherein the node protocol signal indicates the isochronous protocol, and wherein the data formatted in the isochronous structure is communicated to the node according to the isochronous protocol.

12. The apparatus according to claim 9 wherein the frame receiving circuitry includes isochronous converting circuitry for converting received data formatted in the frame structure into data formatted in the isochronous structure.

13. The apparatus according to claim 12 wherein the node protocol signal indicates the isochronous protocol, and wherein the converted data formatted in the isochronous structure is communicated to the node according to the isochronous protocol.

14. The apparatus according to claim 9 wherein the frame receiving circuitry includes packet converting circuitry for converting received data formatted in the frame structure into data formatted in the packet structure.

15. An apparatus as set forth in claim 1 wherein said node transmitter transmits said node protocol signal responsive to said node receiver receiving said hub protocol signal.

16. In a data communication network comprising a hub coupled to at least one node, an apparatus for establishing communication between the hub and a node comprising:

a hub transmitter coupled to the hub for transmitting a hub protocol signal to the node, the hub protocol signal indicating a communication protocol, including a format for a data transmission, with which the hub is capable of communicating;

a protocol identifying circuit coupled to the node receiver for identifying the communication protocol indicated by the hub protocol signal from among a plurality of possible communication protocols with which the node is capable of communicating; and a node transmitter coupled to the protocol identifying circuit for transmitting a node protocol signal, including a format for a data transmission, to the hub indicating that communication between the hub and the node will take place with the protocol indicated by the hub protocol signal.

17. The apparatus according to claim 16 wherein the node receiver includes frame receiving circuitry for receiving data formatted in a frame structure, and packet receiving circuitry for receiving data formatted in a packet structure, wherein the received data formatted in the frame structure and the received data formatted in the packet structure are received over the same receiving communication path, and wherein the node transmitter includes frame transmitting circuitry for transmitting data formatted in the frame structure, and packet transmitting circuitry for transmitting data formatted in the packet structure, wherein the data formatted in the frame structure and the data formatted in the packet structure are transmitted over the same transmitting communication path.

18. The apparatus according to claim 17 wherein the hub protocol signal indicates an ethernet protocol, and wherein the data formatted in the packet structure is formatted according to the ethernet protocol.

19. The apparatus according to claim 17 wherein the hub protocol signal indicates a token-ring protocol, and wherein the data formatted in the packet structure is formatted according to the token-ring protocol.

20. The apparatus according to claim 17 wherein the frame receiving circuitry includes packet converting circuitry for converting received data formatted in a frame structure into data formatted in a packet structure.

21. The apparatus according to claim 16 wherein the node receiver includes frame receiving circuitry for receiving data formatted in a frame structure, and isochronous receiving circuitry for receiving data formatted in an isochronous structure, wherein the received data formatted in the frame structure and the received data formatted in the isochronous structure are received over the same receiving communication path, and wherein the node transmitter includes frame transmitting circuitry for transmitting data formatted in the frame structure, and isochronous transmitting circuitry for transmitting data formatted in the isochronous structure, wherein the data formatted in the frame structure and the data formatted in the isochronous structure are transmitted over the same transmitting communication path.

22. The apparatus according to claim 21 wherein the hub protocol signal indicates an isochronous protocol, and wherein the transmitted data formatted in the isochronous structure is communicated to the hub according to the isochronous protocol.

23. The apparatus according to claim 21 wherein the frame receiving circuitry includes isochronous converting circuitry for converting received data formatted in the frame structure into data formatted in the isochronous structure.

24. In a data communication network comprising a hub coupled to at least one node, an apparatus for establishing communication between the hub and a node comprising:

a hub transmitter coupled to the hub for transmitting a hub protocol signal to the node, the hub protocol signal indicating one of a plurality of communication protocols, including a format for a data transmission, with which the hub is capable of communicating;

a node receiver coupled to the node for receiving the hub protocol signal;

a first protocol identifying circuit coupled to the node receiver for identifying the communication protocol indicated by the hub protocol signal from among a plurality of communication protocols with which the node is capable of communicating;

a node transmitter coupled to the node receiver for transmitting a node protocol signal to the hub, the node protocol signal indicating the communication protocol, including a format for a data transmission, indicated by the hub protocol signal if the communication protocol indicated by the hub protocol signal is a communication protocol with which the node is capable of communicating;

a hub receiver coupled to the hub for receiving the node protocol signal;

a second protocol identifying circuit coupled to the hub receiver for identifying the communication protocol indicated by the node protocol signal from among a plurality of communication protocols with which the hub is capable of communicating;

wherein the hub transmitter includes a communication circuit for communicating with the node using the communication protocol indicated by the node protocol signal in response thereto.

25. The apparatus according to claim 24 wherein said data communication network comprises a plurality of nodes and the data communication network is configured in a star topology.

26. The apparatus according to claim 24 wherein said data communication network comprises a plurality of hubs wherein the hubs are configured in a ring topology.

27. The apparatus according to claim 24 wherein said data communication network comprises a plurality of nodes and wherein the nodes are configured in a tree topology.

28. The apparatus according to claim 24 wherein the hub protocol signal comprises a series of 100 nanosecond pulses occurring at nominal 16 millisecond intervals.

29. The apparatus according to claim 24 wherein the hub receiver includes frame receiving circuitry for receiving data formatted in a frame structure, and packet receiving circuitry for receiving data formatted in a packet structure, wherein the received data formatted in a frame structure and the received data formatted in the packet structure are received over the same receiving communication path, and wherein the hub transmitter includes frame transmitting circuitry for transmitting data formatted in a frame structure, and packet transmitting circuitry for transmitting data formatted in a packet structure, wherein the transmitted data formatted in the frame structure and the transmitted data formatted in the packet structure are transmitted over the same transmitting communication path.

30. The apparatus according to claim 29 wherein the hub protocol signal comprises a signal indicating a protocol corresponding to data formatted in the frame structure, and wherein the node protocol signal comprises a signal indicating a protocol corresponding to data formatted in the frame structure.

31. The apparatus according to claim 29 wherein the hub protocol signal indicates an isochronous-ethernet protocol, and wherein the transmitted data formatted in the frame structure is formatted according to the isochronous-ethernet protocol.

32. The apparatus according to claim 29 wherein the hub protocol signal indicates an isochronous-token ring protocol, and wherein the transmitted data formatted in the frame structure is formatted according to the isochronous-token ring protocol.

33. The apparatus according to claim 29 wherein the hub protocol signal indicates an ethernet protocol, and wherein the transmitted data formatted in the packet structure is formatted according to the ethernet protocol.

34. The apparatus according to claim 29 wherein the hub protocol signal indicates a token-ring protocol, and wherein the transmitted data formatted in the packet structure is formatted according to the token-ring protocol.

35. The apparatus according to claim 29 wherein the frame receiving circuitry includes packet converting circuitry for converting received data formatted in the frame structure into data formatted in the packet structure.

36. The apparatus according to claim 35 wherein the hub protocol signal indicates an ethernet protocol, and wherein the transmitted data formatted in the packet structure is formatted according to the ethernet protocol.

37. The apparatus according to claim 35 wherein the hub protocol signal indicates a token-ring protocol, and wherein the transmitted data formatted in the packet structure is formatted according to the token-ring protocol.

38. The apparatus according to claim 35 wherein the hub protocol signal indicates an isochronous-ethernet protocol, and wherein the transmitted data formatted in the frame structure is formatted according to the isochronous-ethernet protocol.

39. The apparatus according to claim 35 wherein the hub protocol signal indicates an isochronous-token ring protocol, and wherein the transmitted data formatted in the frame structure is formatted according to the isochronous-token ring protocol.

40. The apparatus according to claim 29 wherein the frame receiving circuitry includes isochronous converting circuitry for converting received data formatted in a frame structure into data formatted in an isochronous structure.

41. The apparatus according to claim 40 wherein the hub protocol signal indicates an isochronous protocol.

42. An apparatus as set forth in claim 24 wherein said node transmitter transmits said node protocol signal responsive to said node receiver receiving said hub protocol signal.

43. The apparatus according to claim 24 wherein the hub receiver includes frame receiving circuitry for receiving data formatted in a frame structure, and isochronous receiving circuitry for receiving data formatted in an isochronous structure, wherein the received data formatted in a frame structure and the received data formatted in the isochronous structure are received over the same receiving communication path, and wherein the hub transmitter includes frame transmitting circuitry for transmitting data formatted in a frame structure, and isochronous transmitting circuitry for transmitting data formatted in an isochronous structure, wherein the transmitted data formatted in the frame structure and the transmitted data formatted in the isochronous structure are transmitted over the same transmitting communication path.

44. The apparatus according to claim 43 wherein the hub protocol signal indicates an isochronous protocol.

45. The apparatus according to claim 43 wherein the hub protocol signal indicates an isochronous-ethernet protocol, and wherein the transmitted data formatted in the frame structure is formatted according to the isochronous-ethernet protocol.

46. The apparatus according to claim 43 wherein the hub protocol signal indicates an isochronous-token ring protocol, and wherein the transmitted data formatted in the frame structure is formatted according to the isochronous-token ring protocol.

47. The apparatus according to claim 43 wherein the frame receiving circuitry includes isochronous converting circuitry for converting received data formatted in a frame structure into data formatted in an isochronous structure.

48. The apparatus according to claim 47 wherein the hub protocol signal indicates an isochronous protocol.

49. The apparatus according to claim 48 wherein the hub protocol signal indicates an isochronous-ethernet protocol, and wherein the transmitted data formatted in the frame structure is formatted according to the isochronous-ethernet protocol.

50. The apparatus according to claim 47 wherein the hub protocol signal indicates an isochronous-token ring protocol, and wherein the transmitted data formatted in the frame structure is formatted according to the isochronous-token ring protocol.

51. The apparatus according to claim 47 wherein the frame receiving circuitry includes packet converting circuitry for converting received data formatted in a frame structure into data formatted in a packet structure.

52. The apparatus according to claim 51 wherein the hub protocol signal indicates an ethernet protocol, and wherein the transmitted data formatted in the packet structure is formatted according to the ethernet protocol.

53. The apparatus according to claim 51 wherein the hub protocol signal indicates a token-ring protocol, and wherein the transmitted data formatted in the packet structure is formatted according to the token-ring protocol.

54. The apparatus according to claim 51 wherein the hub protocol signal indicates an isochronous-ethernet protocol, and wherein the transmitted data formatted in the frame structure formatted according to the isochronous-ethernet protocol.

55. The apparatus according to claim 51 wherein the hub protocol signal indicates an isochronous-token ring protocol, and wherein the transmitted data formatted in the frame structure is formatted according to the isochronous-token ring protocol.

56. The apparatus according to claim 51 wherein the hub protocol signal indicates an isochronous protocol.

57. In a data communication network comprising at least first and second communication endpoints, an apparatus for establishing communication between the first and second endpoints comprising:

a first endpoint transmitter coupled to the first endpoint for transmitting a first endpoint protocol signal to the second endpoint, the first endpoint protocol signal indicating a communication protocol, including a format for data transmission, with which the first endpoint is capable of communicating;

a second endpoint receiver coupled to the second endpoint for receiving the first endpoint protocol signal;

a second endpoint transmitter coupled to the second endpoint receiver for transmitting a second endpoint protocol signal to the first endpoint, the second endpoint protocol signal indicating a communication protocol, including a format for data transmission with which the second endpoint is capable of communicating;

a first endpoint receiver coupled to the first endpoint for receiving the second endpoint protocol signal;

a protocol identifying circuit coupled to the first endpoint receiver for identifying the communication protocol indicated by the second endpoint protocol signal from among a plurality of possible communication protocols with which the first endpoint is capable of communicating; and a communication circuit in said first endpoint transmitter responsive to said protocol identifying circuit for communicating with the second endpoint using the communication protocol indicated by the second endpoint protocol signal.

58. The apparatus according to claim 57 wherein the communication circuit includes a first receiver sub-circuit in said first endpoint receiver and a first transmitter sub-circuit in said first endpoint transmitter for communicating using a first communication protocol and a second receiver sub-circuit in said first endpoint receiver and a second transmitter sub-circuit in said first endpoint transmitter for communicating using a second communication protocol, and wherein said communication circuit communicates with said second endpoint using one of said first receiver and transmitter sub-circuits and said second receiver and transmitter sub-circuits responsive to said second endpoint protocol signal.

59. The apparatus according to claim 58 wherein the first sub-circuit includes frame receiving circuitry for receiving data formatted in a frame structure, and the second sub-circuit includes packet receiving circuitry for receiving data formatted in a packet structure and wherein the received data formatted in the frame structure and the received data formatted in the packet structure are received over the same receiving communication path, and wherein the first sub-circuit further includes frame transmitting circuitry for transmitting data formatted in the frame structure, and the second sub-circuit includes packet transmitting circuitry for transmitting data formatted in the packet structure, wherein the data formatted in the frame structure and the data formatted in the packet structure are transmitted over the same transmitting communication path.

60. The apparatus according to claim 59 wherein the first endpoint protocol signal comprises a signal indicating a protocol corresponding to data formatted in the frame structure, and wherein the second endpoint protocol signal comprises a signal indicating a protocol corresponding to data formatted in the packet structure.

61. The apparatus according to claim 59 wherein the second endpoint protocol signal indicates an ethernet protocol, and wherein the data formatted in the packet structure is formatted according to the ethernet protocol.

62. The apparatus according to claim 59 wherein the second endpoint protocol signal indicates a token-ring protocol, and wherein the data formatted in the packet structure is formatted according to the token-ring protocol.

63. The apparatus according to claim 59 wherein the frame receiving circuitry includes packet converting circuitry for converting received data formatted in the frame structure into data formatted in the packet structure.

64. The apparatus according to claim 63 wherein the second endpoint protocol signal indicates an ethernet protocol, and wherein the data formatted in the packet structure is formatted according to the ethernet protocol.

65. The apparatus according to claim 63 wherein the second endpoint protocol signal indicates a token-ring protocol, and wherein the data formatted in the packet structure is formatted according to the token-ring protocol.

66. The apparatus according to claim 58 wherein the first sub circuit includes frame receiving circuitry for receiving data formatted in a frame structure, and the second sub-circuit includes isochronous receiving circuitry for receiving data formatted in an isochronous structure, wherein the received data formatted in the frame structure and the received data formatted in the isochronous structure are received over the same receiving communication path, and wherein the first sub-circuit further includes frame transmitting circuitry for transmitting data formatted in a frame structure, and the second sub-circuit further includes isochronous transmitting circuitry for transmitting data formatted in an isochronous structure, wherein the data formatted in the isochronous structure and the data formatted in the frame structure are transmitted over the same transmitting communication path.

67. The apparatus according to claim 66 wherein the first endpoint protocol signal comprises a signal indicating a protocol corresponding to data formatted in the frame structure, and wherein the second endpoint protocol signal comprises a signal indicating a protocol corresponding to data formatted in the isochronous structure.

68. The apparatus according to claim 66 wherein the second endpoint protocol signal indicates the isochronous protocol, and wherein the data formatted in the isochronous structure is communicated to the second endpoint according to the isochronous protocol.

69. The apparatus according to claim 66 wherein the frame receiving circuitry includes isochronous converting circuitry for converting received data formatted in the frame structure into data formatted in the isochronous structure.

70. The apparatus according to claim 69 wherein the second endpoint protocol signal indicates the isochronous protocol, and wherein the converted data formatted in the isochronous structure is communicated to the second endpoint according to the isochronous protocol.

71. The apparatus according to claim 66 wherein the frame receiving circuitry includes packet converting circuitry for converting received data formatted in the frame structure into data formatted in the packet structure.

72. In a data communication network comprising at least first and second communication endpoints, an apparatus for establishing communication between the first and second endpoints comprising:

a first endpoint transmitter coupled to the first endpoint for transmitting a first endpoint protocol signal to the second endpoint, the first endpoint protocol signal indicating a communication protocol, including a format for data transmission, with which the first endpoint is capable of communicating;

a second endpoint receiver coupled to the second endpoint for receiving the first endpoint protocol signal;

a second endpoint transmitter coupled to the second endpoint receiver for transmitting a second endpoint protocol signal, responsive to receipt of said said first endpoint protocol signal, to the first endpoint, the second endpoint protocol signal indicating a communication protocol, including a format for data transmission with which the second endpoint is capable of communicating;

a first endpoint receiver coupled to the first endpoint for receiving the second endpoint protocol signal;

a protocol identifying circuit coupled to the first endpoint receiver for identifying the communication protocol indicated by the second endpoint protocol signal from among a plurality of possible communication protocols with which the first endpoint is capable of communicating; and a communication circuit in said first endpoint transmitter responsive to said protocol identifying circuit for communicating with the second endpoint using the communication protocol indicated by the second endpoint protocol signal.

* * * * *

UNITED STATES PATENT AND TRADEMARK OFFICE
CERTIFICATE OF CORRECTION

PATENT NO. : 5,687,174
DATED : November 11, 1997
INVENTOR(S) : Brian C. Edem et al.

It is certified that error appears in the above-identified patent and that said Letters Patent is hereby corrected as shown below:

In Col. 17, line 63, delete "48" and replace with --47--.

In Col. 18, line 21, after "structure" insert --is--.

Signed and Sealed this

Tenth Day of February, 1998

BRUCE LEHMAN

Attest:

Attesting Officer

Commissioner of Patents and Trademarks